United States Patent [19]
Lechner

[11] Patent Number: 5,323,763
[45] Date of Patent: Jun. 28, 1994

[54] ABSORBER BODY WITH FLOW PATHS FOR WATER OR A FLOWABLE HEAT CARRIER AND PROCESS FOR THE PRODUCTION THEREOF

[75] Inventor: Rudolf Lechner, Singen, Fed. Rep. of Germany

[73] Assignee: Colux Gesellschaft Fur Licht- u. Leichtbau mbH, Singen, Fed. Rep. of Germany

[21] Appl. No.: 823,319

[22] Filed: Jan. 21, 1992

[30] Foreign Application Priority Data

Jan. 22, 1991 [DE] Fed. Rep. of Germany ....... 4101664
Jan. 29, 1991 [DE] Fed. Rep. of Germany ....... 4102511

[51] Int. Cl.⁵ .................................................. F24J 2/36
[52] U.S. Cl. ..................................... 126/626; 126/675; 126/707; 126/714
[58] Field of Search ............... 126/426, 415, 443, 444, 126/445, 448, 450, 442, 624, 704, 626, 627, 634, 652, 665, 675, 669, 674, 705, 661, 707, 714

[56] References Cited

U.S. PATENT DOCUMENTS

| | | | |
|---|---|---|---|
| 4,080,955 | 3/1978 | Sandstrom | 126/426 |
| 4,243,021 | 1/1981 | Homsy et al. | 126/426 |
| 4,471,759 | 9/1984 | Anderson | 126/426 |

FOREIGN PATENT DOCUMENTS

| | | | |
|---|---|---|---|
| 2513363 | 3/1983 | France | 126/426 |
| 1535960 | 12/1978 | United Kingdom | 126/426 |

Primary Examiner—James C. Yeung
Attorney, Agent, or Firm—Bachman & LaPointe

[57] ABSTRACT

An absorber body with flow paths for water or a flowable heat carrier for the direct or indirect heating of fluid or fluids or the like flow agents by solar energy in which the flow paths are produced by the deformation of plastic material, is improved in respect of its production and use in that a panel (12) is provided with slot-like openings, the width of which approximately corresponds to the width of the flow path, and welded on the panel is a foil (14) which is deformed through the openings to form respective shaped foil portions (15) of approximately channel-like cross-section as partial delimitation of the flow path and is sealingly covered on the side remote from the channel-like cross-section. In that arrangement, a carrier plate, a cover foil (50) or an insulating body (54) may be provided on the side of the panel (12) which is remote from the channel-like cross-section of the foil portion (15). The panel is provided with openings correspond to the pattern of the flow paths and is covered over its surface with the foil (14), whereupon the foil is deep-drawn through the openings.

35 Claims, 4 Drawing Sheets

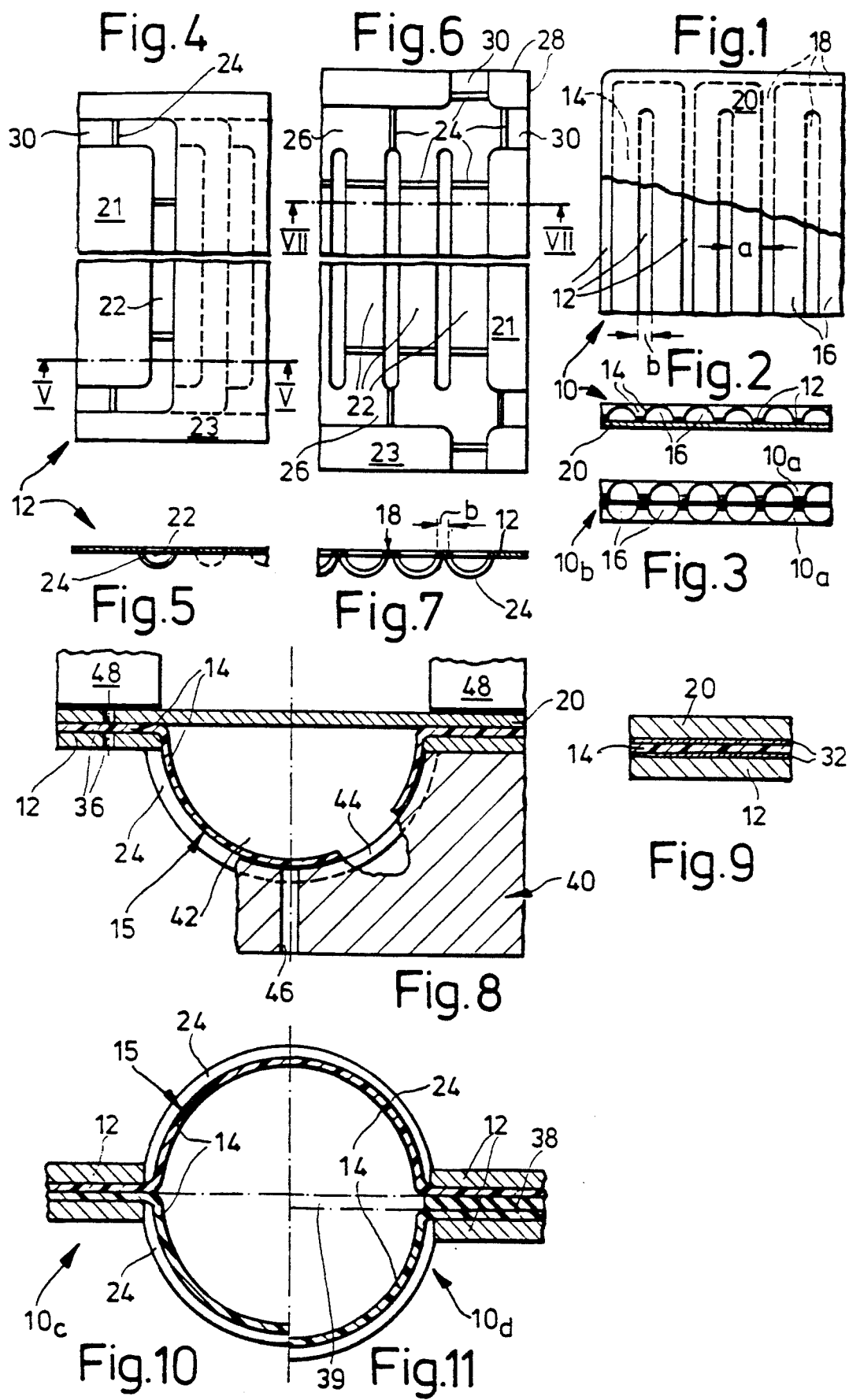

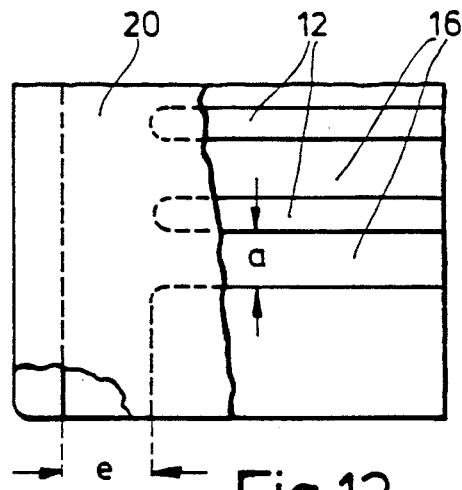
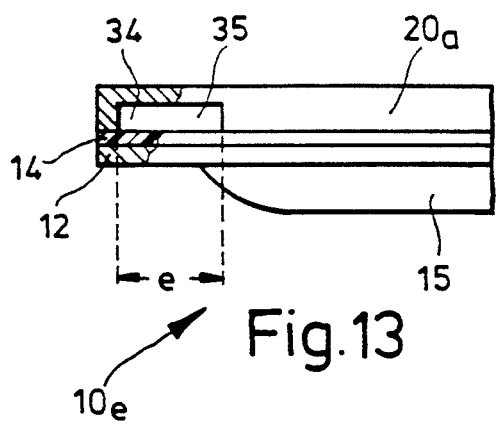
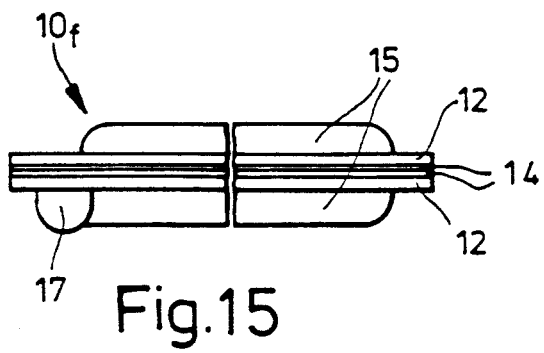
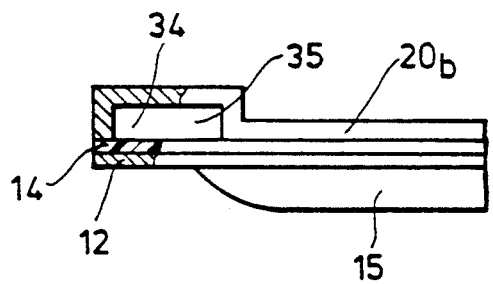
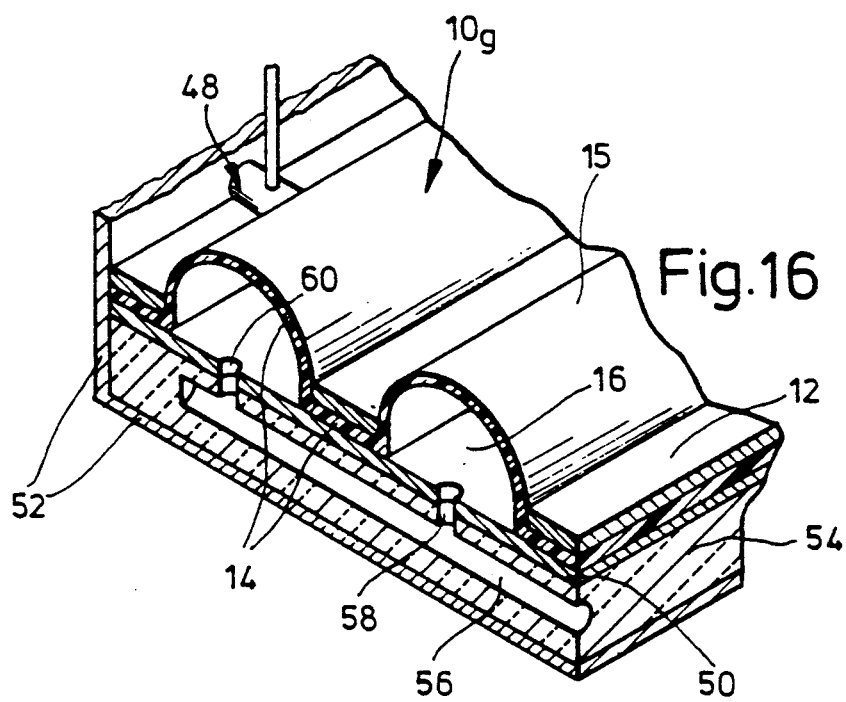

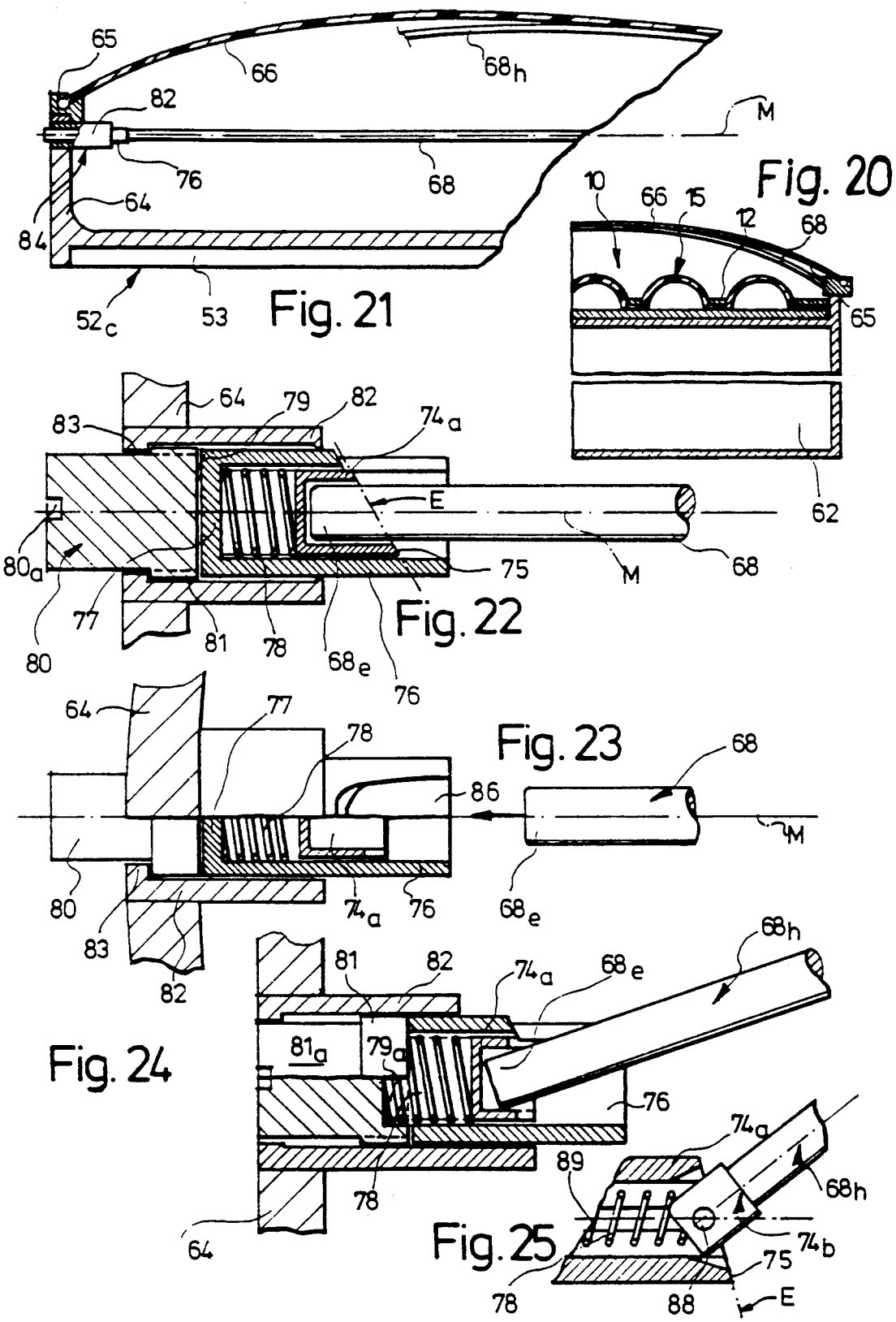

ABSORBER BODY WITH FLOW PATHS FOR WATER OR A FLOWABLE HEAT CARRIER AND PROCESS FOR THE PRODUCTION THEREOF

BACKGROUND OF THE INVENTION

The invention relates to an absorber body with flow paths for water or a flowable heat carrier for the direct or indirect heating of fluid or fluids or the like flow agents by solar energy, in which the flow paths are produced by the deformation of plastic material. The invention also concerns a process which is particularly suitable for the production of the absorber body.

So-called solar heating systems use energy storage means which comprise for example rubber mats in which tubular flow routes receive cold water from a feed pipe and pass it to a return in those flow routes, with the water being heated by incident solar radiation. Absorbers of that kind are used in particular for the direct heating of swimming pool water which is usually circulated by means of pumps.

In contrast to that mode of direct heating of water for industrial use, indirect systems require a fluid heat carrier such as water which is possibly mixed with an antifreeze agent and which flows through the pipe system, which covers a certain area, in a closed circuit. In a heat exchanger, the fluid heat carrier gives off its energy to a related water circuit, while accepting losses.

Solar collectors are generally installed at an inclined angle, for example on a roof surface, and, with increasing temperature, their heat carrier is driven upwardly in a natural circuit (thermosiphon effect) to an heat exchanger disposed at the upper end of the collector surface, in order to flow downwardly again after having given off energy.

Those collectors which are exposed to the effect of the sun may have separating walls which extend between two parallel surfaces transversely with respect thereto, to define the flow path, or they may have tube portions which are formed at a surface thereof, the parallel mouth openings of which are connected together by respective transverse tubes so that they can be connected to feed and return means.

The materials used for the flow paths should be resistant to weathering, temperature and chemicals, that is to say they should be resistant to aging. Particularly, in the case of indirect systems for roof installation, the influence of weathering can be reduced by having the surface structures through which ducts pass and which are made from synthetic rubber such as polymerized ethylenes and propylenes disposed in a housing beneath a glass plate or panel which at the same time can cause an accumulation of heat in the housing.

A disadvantage of known absorber mats and bodies is their comparatively expensive manufacture, while a further deficiency, in the case of indirect heating systems, in particular for swimming pools, lies in the fact that the water at least retains its undesirable load of bacteria while it passes through the collector.

SUMMARY OF THE INVENTION

In consideration of the state of the art, the inventor set himself the aim of providing an absorber body which is inexpensive to produce and which enjoys a long life.

The invention further seeks to provide an absorber body which is capable of eliminating bacteriological contamination in the water or the like flowing therethrough.

That object is attained by an apparatus as set forth in claim 1, and in addition the teaching relating to the production of an absorber body as set forth in the independent process claim.

A panel or cover plate which is preferably colored black is provided with openings which correspond to the pattern of the flow paths, and is covered over its area with a foil, whereupon the latter is deformed through the openings to provide channel profiles or foil ducts and then, possibly also beforehand is connected to the cover panel in the zones which occur therebetween. The zones should preferably be flat in order to promote thermal connection with pressing or welding members. By virtue of the flat surface of those welding zones, it is possible to use a continuous welding machine for the welding operation since the machine does not encounter obstacles or butt edges as would be present for example when welding a deformed foil on the plate or panel, instead of the foil ducts which extend through same. Since the welding operation on the foil, or the pressing operation when using an adhesive procedure, is effected at the side of the panel or plate which is remote from the foil ducts, that ensures very simple and inexpensive manufacture of such absorber bodies.

A further advantage can be seen in the point that, in accordance with the process, the foil can be welded without delay immediately after the deep drawing operation, that is to say, utilizing the deep drawing temperature.

However, the durability of the described system is of particular significance. Shear loadings, which have adverse effect between an underlying structure on the one hand and a foil which is welded thereto, in regard to the action of the pressure of the flow agent, cannot give rise to damage to the foil which is welded under the cover plate or panel as the cover panel forms a support to withstand the pressure forces for the foil which is deep drawn through the openings and which is preferably fixedly connected, in particular welded, to the cover panel.

It has been found to be advantageous for the foil to be welded between the channel-shaped recesses to a carrier plate which extends over those recesses. For that purpose, the carrier plate, like the cover panel, can be connected on the foil side to a layer which helps with the welding operation.

In order to provide an additional bond between the layers of the system, the plates may be provided in the welding region with bores for the shanks of connecting members which force-lockingly hold the described composite system together.

In accordance with the invention, a particular embodiment includes two cover panels with patterns of openings which correspond to each other, which are each provided with a deep-drawn foil and which are connected together by tubular cross-sections formed by the deformation portions of the foil. Between the two cover panels, there may be an intermediate plate which has apertures and which has an additional stabilizing effect, the apertures approximately corresponding to the openings in the cover panel or panels.

In accordance with the invention, the openings in the cover panel may be provided at spacings with part circular loop limb portions whose cross-sectional shape corresponds to that of the deformed portions of the foil. The limb portions hold together the cover panel which is used as an integrated working former. Additionally, they can be retained on the finished absorber body, acting as additional stiffening means.

The absorber structure comprising the cover panel which is provided with openings and which may comprise plastic material or metal, on the one hand, and the deformed foil which extends through the cover panel in the region of the openings, on the other hand, ensures reliable operation as no shearing forces can produce an effect in the weld zones.

Furthermore, the operation of thermally joining the foil to the panel is effected on the flat rear side thereof and thus without any obstacles, which makes it possible to use continuous welding procedures. The same consideration applies in regard to the application of the carrier plate, foil or like holding surface means, which also defines the flow paths.

The system consisting of the cover panel and a foil which is deformed to extend through same can be used in different embodiments of absorbers or through-flow bodies with an absorbent boundary on the rear side, as will be illustrated in greater detail hereinafter.

The part of the object of the invention which is concerned with being able to have an influence on bacteria cultures with the absorber body according to the invention in relation to direct swimming pool heating systems is attained in particular by the selection of a foil of modified ethylenetetrafluoroethylene copolymers. The UV-light passes into the collector interior through that or a corresponding UV-resistant foil, and that gives the desired effect.

Of particular and independently inventive significance is the particular design configuration of a housing with cover foil for the absorber body, which housing can also be used for example for wide surfaces which are to be covered over. Such a housing comprising a rectangular basin with a plastic foil stretching from one edge of the basin to the other is disclosed in DE-A-35 37 223. In accordance with the invention, the cover foil which is stretched towards the edge is stretched by flexible tensioning elements, in particular by bendable tensioning bars for example of glass fiber, which are either seated at respective ends in movable mountings or which are fixed at one end and movable at the other end. At any event, curvature of the tensioning bar is possible, the tensioning bar then pressing against the cover foil and synclastically tensioning same. In addition, the cover foil can be tensioned approximately parallel to the fixing line by at least one inwardly disposed tensioning ring of variable arc length.

In accordance with a particular feature of the invention, the cover foil is spread out by means of tensioning bars which are adapted to be operable from the outside of the housing. For that purpose, the mounting bush is mounted axially movably in a guide member and is possibly supported therein against a force storage means, said guide member preferably being of a cylindrical configuration.

In order to permit compensation in respect of foil movements, the mounting bush and/or guide member are to be adapted to be acted upon by an axially operative pressure member which passes through the housing wall accommodating it, and which can possibly be moved as a tensioning piston in a cylinder-like element. That tensioning piston cooperates with an end abutment of the cylindrical element forming a tensioning housing, and preferably meshes by way of an external thread with an internal thread in the tensioning housing, in which it is thus to be displaced in a simple fashion.

In accordance with a further feature of the invention, there are guide elements for mounting the tensioning bar, which guide elements define the path of movement of the curvable tensioning bar when the tensioning piston or the like member is moved axially inwardly. That arrangement may comprise in particular edge recesses in the mounting bush and/or guide member.

In accordance with the invention, the mounting bush may be mounted pivotably, possibly by means of approximately radial pins or bolts which engage into sliding guides in the mounting element surrounding same.

The scope of the invention further includes a process for the production of an absorber body in which a panel is provided with openings corresponding to the pattern of the flow paths and is covered over its surface with a foil, whereupon the foil is deformed through the openings to provide bead-like or bulged channel profiles or foil ducts, and is then preferably connected to the panel in the weld zones between the channel profiles or foil ducts. The foil is also deep drawn through the openings.

BRIEF DESCRIPTION OF THE DRAWINGS

Further features of the invention, in particular also relating to a particular configuration of a cover foil and the fixing thereof, are set forth in the subsidiary claims.

Further advantages, features and details of the invention will be apparent from the following description of preferred embodiments and with reference to the drawings in which:

FIG. 1 is a plan view of a part of an absorber body;

FIG. 2 is a view in cross-section through FIG. 1;

FIG. 3 is a view in cross-section through another construction;

FIG. 4 is a plan view of part of a blank for the production of an absorber body;

FIG. 5 is a view in cross-section through FIG. 4 taken along line V—V therein;

FIG. 6 is a plan view of part of another blank;

FIG. 7 is a view in cross-section through FIG. 6 taken along line VII—VII therein;

FIG. 8 is a part of a cross-section through an absorber body in the course of production, on a larger scale than FIGS. 5 and 7;

FIG. 9 shows an enlarged detail from FIG. 8;

FIGS. 10 and 11 are views in cross-section through parts of two embodiments of absorber bodies;

FIG. 12 is a plan view of part of another absorber body;

FIGS. 13 and 14 are partly sectional end views of constructions as shown in FIG. 12;

FIG. 15 is a side view of another embodiment;

FIG. 16 is a perspective view of a part of a further absorber body;

FIG. 20 shows part of FIG. 19 in a modified construction on a reduced scale;

FIG. 21 shows another part of FIG. 19 with another mounting mode for a tensioning bar;

FIG. 22 is a view of a part of FIG. 21 on an enlarged scale;

FIG. 23 shows plan views of FIG. 22;

FIG. 24 shows details from FIG. 22 of another embodiment and in a different operating position; and FIG. 25 shows a part of FIGS. 22 through 24 in a particular configuration.

DETAILED DESCRIPTION

Figure 17:
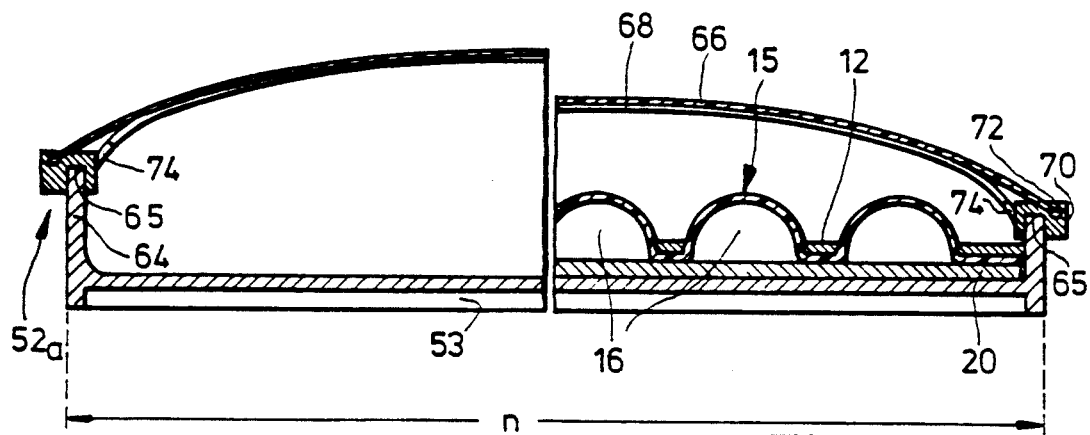
FIG. 17 is a view in section through a housing with absorber body and a cover foil which is held by tensioning bars.

A flat absorber or through-flow body 10 for water for industrial use, a heat carrier liquid, or a gas as a heat carrier of a collector installation, comprises a cover plate or panel 12 and a translucent foil 14 which is welded on to same and which comprises UV-transmissive and UV- and weather-resistant plastic material which, with a carrier plate 20 colored black, defines meander-like flow paths 16 of a width as indicated at (a) for the water. In the region of weld zones 18 of a width as indicated at (b), the foil 14 is welded to the carrier plate 20 and on to the cover panel 12, from which the basic outline of the flow paths 16 was stamped out or removed in another fashion.

The material for the foil 14 is preferably a modified ethylene-tetrafluoroethylene copolymer; that flame-resistant foil 14 is highly transparent and weather-resistant. The degree of transparency in the range of visible light is for example between 94% and 97% (total light) in the case of a 100 um foil and transmission in the ultraviolet range (between 320 and 380 nm) is between 83% and 88%. The foil 14 is also highly UV-transmissive in the spectral range of solar radiation. In addition, the specified material of the foil 14 enjoys a high degree of absorption in the infra-red range (heat retention capability). It does not absorb water, and it is resistant to solvents and chemicals as well as being dirt-repellent.

In the construction shown in FIG. 3, two body portions 10a, each without a respective carrier plate, have been laid one upon the other with the surfaces of their cover panels 12, and joined together to form a through-flow body 10b.

FIG. 4 shows a part of a cover panel 12 of metal or plastic material, in which an opening 22 which is U-shaped in plan view can be seen, for a flow path 16; further openings are shown in dash-dotted lines. The two panel portions 21, 23 which define the opening 22 are joined by loop strip portions 24 which are semicircular in cross-section as shown in FIG. 5.

In the embodiment shown in FIGS. 6 and 7, it can be seen that there are a plurality of parallel openings 22 which open at each end into a respective transverse opening 26 which with the openings 22 provides a ladder like pattern of flow paths 16. Extending from the two transverse openings 26, at the corners of the panel edges 28, are strip-like edge recesses 30 which define the coupling options of the through-flow body 10 which is formed by means of the cover panel 12.

For production of a through-flow body 10, the cover panel 12 is introduced into a deep drawing mold which is only indicated at 40 and which has channels 42 of part-circular cross-section corresponding to the subsequent flow paths 16, as well as insertion grooves 44, which additionally radially adjoin the channels 42, for the loop strip portions 24.

A foil 14 is laid on to the cover panel 12 over the surface thereof, the system is then brought up to the deep drawing temperature and the foil 14 is deep drawn into the channels 42; an exhaust channel provided for that purpose is identified by reference numeral 46 in FIG. 8. The cover panel 12 which is covered on the foil side with a layer 32 (FIG. 9) for helping the welding operation and which is provided with the foil ducts 15 of part circular cross-section is welded to the foil 14 by means of welding punches or pressing rollers 48 which engage the flat side of the panel, preferably utilizing the deep drawing temperature.

In FIG. 8, prior to the welding operation, the above-mentioned carrier plate 20 has also been fitted into position, the carrier plate 20 also being provided with a coating to assist with welding. Reference numeral 36 identifies prepared bores in the plates 12, 20, by means of which additional connection of the panels 12, 20 by screws or rivets (not shown) is simplified.

As shown in FIG. 10, a through-flow body $10_c$ has two foil-bearing cover panels 12 with substantially the same pattern of openings, while FIG. 11 shows a through-flow body $10_d$ with cover panels 12 with foil 14, which are fixed on both sides of a slotted intermediate plate 38. The intermediate plate 38 is in turn provided with apertures 39 corresponding to the pattern of the flow paths 16.

A plurality of the finished through-flow bodies $10_a$ through $10_d$ are arranged in juxtaposed relationship on a roof surface or the like (not shown for the sake of clarity of the drawing) and sealingly connected by couplings (also not shown) for the flow medium, which couplings are disposed in connection openings which issue from the edge recesses 30 and which are so provided as to permit multiple association of adjacent through-flow bodies $10_a$ through $10_d$ with each other.

The cross-sections of the connection openings generally correspond to those of the adjoining foil ducts 16. In the case of the through-flow body $10e$ in FIGS. 12 through 14, however, the connection opening 34 is flat so that its width e is greater than the width a of the subsequent flow paths 16 which, as described above, are of semicircular cross-section.

In order to make it clear that instead of the connecting ducts 17 (see FIG. 15) produced in the transverse apertures 26 consisting of foil 14, it is also possible to provide in the carrier plate $20_a$ itself a transverse communication 35 for the foil ducts 15 which are disposed at a right angle thereto. The foil 14 is also shown on an exaggerated scale in FIGS. 13 and 14. The carrier plate $20_b$ has a shaped portion thereon for the transverse connection 35.

A through-flow body $10f$ can be produced in a simple fashion from a lower portion with transversely extending connecting duct 17 on a foil portion with deep-drawn foil ducts 15 in a cover panel 12, in the described manner, lying on the latter; fitted on to the first portion is a second portion which is provided exclusively with foil ducts 15. In the manufacture of the second portion, the foil ducts 15 supplement those of the other portion to provide a tubular cross-section, and it is possible to omit the connecting duct 17. Thus, it is here too possible to effect welding continuously and without encountering obstacles.

As shown in FIG. 16, a cover panel 12 of black metal or another radiation-absorbent material with a foil 14, which is fixed thereto by welding or an adhesive procedure and which is partially deep-drawn to provide foil ducts 15, and a tension foil 50 which defines the foil ducts 15 on the other side, is arranged in a collector housing 52. Disposed beneath the foil 50 is a foamed insulating plate or panel 54 through which extends at least one transverse duct 56 for connecting the flow paths 16 together and to another through-flow body $10_g$. Extending from the transverse duct 56 are branch connections 58 which open at through openings 60 in the foil 50, which is shown in exaggerated form, into the flow path 16. In a construction which is not shown, such openings 60 may also be provided in the foil 14 and sealingly connected to a transverse duct or the like.

Reference numeral 48 indicates a pressure roller of a welding machine which continuously performs the described welding operation.

In an embodiment which is not shown, the unit consisting of the cover panel 12 and the foil 14 with deep-drawn foil ducts 15 has a carrier plate extending thereover, the carrier plate being sealingly connected to the cover panel 12 at the edges by a flange-like or crimped connection.

In an absorber body, the parallel foil ducts 15 which extend from the cover panel 12 may also have a single plate or panel extending thereover and may be connected by transverse ducts 56 which are inserted into the foil ducts 15, either themselves or by way of branch connections 58.

Figure 18:
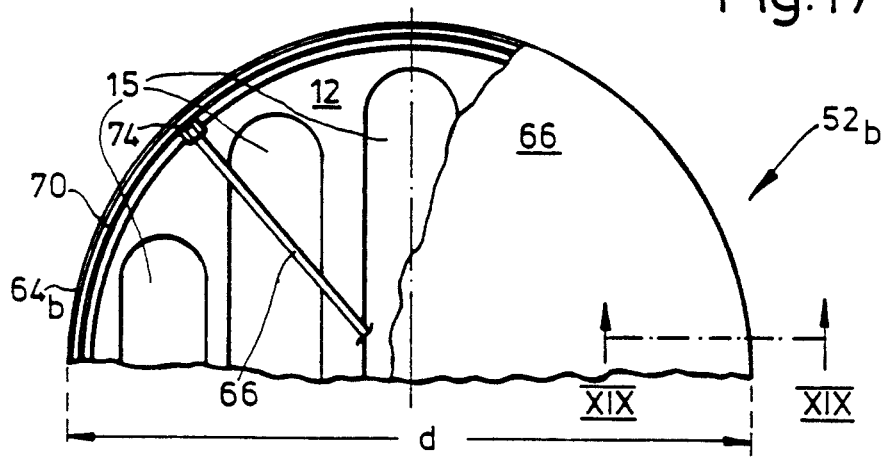
FIG. 18 is a plan view of another, partially open, housing.

As shown in FIG. 17, the described through-flow or absorber body 10 rests in a housing $52_a$, the bottom 53 of which, on its inside, provides the absorbing layer, preferably black. The housing $52_a$ of a width as indicated at n is of rectangular configuration in plan view but in an embodiment $52_b$ as shown in FIG. 18, may also be of a circular configuration, with a diameter as indicated at d. A cover foil 66 comprising the specified UV-resistant material is joined to the side walls 64 of the housing $52_a$ or the annular wall $64_b$ of the housing $52_b$, and is tensioned from below by tensioning bars 68 which are elastic in themselves and which comprise glass fiber material or the like and which are also fixed at both ends to the housing $52_a$, $52_b$ and press against the cover foil 66. The number of tensioning bars 68 depends on the length of the housing $52_a$ or its diameter d.

A channel-like edge profile 70 may serve to connect the tensioning bars 68 and the cover foil 66 to the housing $52_a$, $52_b$. The edge profile 70 receives the upper edge 65 of the side wall 64, $64_b$ and the cover foil 66 is connected to the edge profile 70, for example in a groove 72. The flexible tensioning bars 68 which are possibly variable in length in themselves and which are curved under the roof sheathing 66 are inserted for example in bushes 74.

Figure 19:
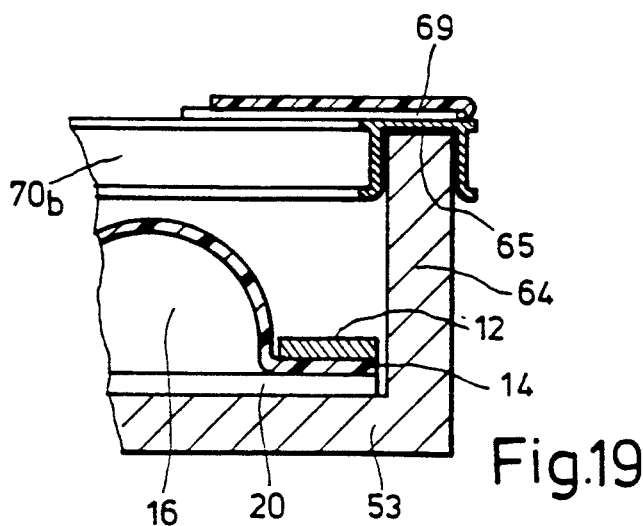
FIG. 19 is a view in section through FIG. 17 taken along line XIX—XIX thereof, on an enlarged scale.

In the case of a round housing $52_b$, as shown in FIG. 19, the roof or cover sheathing 66 which is held to the edge profile $70_b$ therearound is braced by means of an open clamping ring 69 which is also made from that flexible material.

FIG. 20 shows the use of such a through-flow body 10 with tensioned cover foil 66 on a basin 62 for accommodating liquid to be heated, in particular water.

The tensioning bars 68 of the housing $52_c$ in FIG. 21 can be moved, from the exterior, from their horizontal rest position into the tensioning position indicated at $68_h$.

As FIGS. 22 and 23 in particular show, the above-mentioned bush $74_a$ is slidable as a mounting for a bar end $68_e$ on the horizontal axis M of the bar in a guide cylinder 76 and bears against a spring 78. By virtue of the spring, it is possible to compensate for movements of the foil, for example expansion phenomena due to temperature, by virtue of the yielding movement of the bar mounting arrangement $74_a/78$. The spring 78 bears against an end portion 77 of the cylinder or, as shown in FIG. 24, when there is no cylinder end portion, it bears against the end face 79 of a screw piston 80 or in a cavity $79_a$ in the end face 79.

The screw piston 80 is mounted with the coaxial guide cylinder 76 in a tensioning housing 82 which in turn is cylindrical and which sits sealingly in the side wall 64 and which is provided with an abutment ring 83 at its end and, beside same, an internal thread (not shown). The abutment ring 83 is a stop means in respect of movement for a screw threaded ring 81 on the screw piston 80, the external thread of which cooperates with the internal thread of the tensioning housing. The end of the piston body $81_a$, which projects from the housing 82, is provided with a diagonal slot $80_a$ or the like engagement means for a tool, by means of which the screw piston 80 can be axially displaced, and therewith the guide cylinder 76; in that way the spacing between two oppositely disposed tensioning mountings 84 of the above-described kind, which accommodate a tensioning bar 66, can be varied and the tensioning bar 66 can be transferred from the rest position into its tensioning position and vice-versa for relief thereof.

In order to restrain deflection of the tensioning bar 66 during its tensioning movement, the mounting bush $74_a$ may have an edge 75 which is inclined in a plane E (see FIG. 22) and, above the tensioning bar 66, the guide cylinder 76 has an axially extending edge recess 86, as can be seen in particular from FIGS. 23 and 24.

FIG. 25 shows a mounting bush $74_b$ which slides with radial side pins 88 in guide grooves 89 in the guide cylinder 76; that mounting bush $74_b$ is also subjected to the effect of an axially acting spring 78 which in this case is a coil spring.

The drawing does not show that, in another design configuration, in the rest position of the tensioning bar 66, the mounting thereof may also be installed in such a way as to be overall inclined, more specifically in such a fashion that the tensioning bar 66 which is then slightly curved remains with its maximum or highest point beneath the tensioning plane of the cover foil 66 and is then curved upwardly into the tensioning position, as described.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An absorber body with flow paths for a flowable heat carrier for heating flow agents by solar energy comprising a first panel (12) provided with elongated slot-like openings (22), each of said elongated slot-like openings having a width which approximately corresponds to a desired width (a) of a flow path (16), and a translucent foil overlaying said panel, said foil having portions which extend through respective ones of said elongated openings to provide shaped foil portions (15, 17) of substantially channel-like cross-section, and means for sealing said shaped foil portions, said sealing means overlaying said foil.

2. An absorber body as set forth in claim 1 wherein said sealing means comprises a second panel with elongated slot-like openings and a translucent foil which extends through respective ones of said elongated slot-like openings in said second panel to provide shaped foil portions of substantially channel-like cross-section, said first and second panels being connected together, an intermediate plate (38) having apertures (39) provided between the first and second panels (12), and the apertures in said intermediate plate substantially corresponding to the openings (22) in the first and second panels (12).

3. An absorber body as set forth in claim 1 characterized in that the openings (22) in the first panel (12) are connected towards the ends by transverse openings (26) and the transverse openings have a deep-drawn portion (17) of the foil (14) extending therethrough.

4. An absorber body as set forth in claim 3 wherein the transverse openings are provided with edge recesses which reach to the edges of the panel.

5. An absorber body as set forth in claim 4 wherein said edge recesses define coupling regions for an adjacent absorber body.

6. An absorber body as set forth in claim 1 further comprising an insulating body (54) positioned adjacent said sealing means, and said insulating body (54) having at least one transverse duct (56) for connecting the shaped foil portions (15).

7. An absorber body as set forth in claim 6 wherein said sealing means comprises a tension foil (50) extending over said shaped foil portions and further comprising at least one flow path (58) communicating with said at least one transverse duct and passing through the tension foil said.

8. An absorber body as set forth in claim 1 further comprising said openings (22) in the panel (12) being spaced apart, each of said openings being defined by two panel portions and a substantially semi-circular loop strip portion joining said panel portions, said substantially semi-circular loop strip portions (24) having a cross-sectional shape corresponding to that of the shaped foil portions (15, 17).

9. An absorber body as set forth in claim 1 further comprising a housing surrounding said absorber body, said housing having an edge (65) and including a cover foil (66) fixed to the edge (65) of the housing (52$_a$, 52$_b$, 52$_c$) said cover foil being tensioned by flexible tensioning elements.

10. An absorber body as set forth in claim 9 further comprising the cover foil (66) being fixed along a circular fixing line.

11. An absorber body as set forth in claim 10 further comprising the cover foil (66) being tensioned by at least one inwardly disposed tensioning ring (69) of variable arc length located approximately parallel to the fixing line.

12. An absorber body as set forth in claim 9 wherein said tensioning elements include at least one of a tensioning bar (68) formed by a resilient elongate member and a tensioning ring (69) formed by a resilient elongate member.

13. An absorber body as set forth in claim 12 further comprising said cover foil (76) forming a large-area roofing means.

14. An absorber body as set forth in claim 9 wherein said tensioning elements include tensioning bars (68) operable from the exterior of the housing.

15. An absorber body as set forth in claim 14 wherein each of said tensioning bars (68) is fixed at one end (68$_c$) in a bush (74, 74$_a$) mounted in a wall (64) of the housing.

16. An absorber body as set forth in claim 15 further comprising the bush (74$_a$) being axially movably mounted in a guide member (76) and being supported therein against a force storage means (78), and the guide member having a cylindrical configuration.

17. An absorber body as set forth in claim 16 further comprising at least one of the mounting bush (74$_a$) and the guide member (76) being acted upon by and axially operative pressure member (80) which passes through the housing wall (64), said pressure member being movable as a tensioning piston within a cylindrical element (82).

18. An absorber body as set forth in claim 17 further comprising said cylindrical element having a limit abutment and the pressure member (80) cooperating with said limit abutment (83) and said pressure member having a screw threaded ring with an external thread, said screw threaded ring meshing by way of said external thread with an internal thread on said cylindrical element.

19. An absorber body as set forth in claim 17 further comprising edge recesses (86) in at least one of the mounting bush (74$_a$) and the guide member (76), said edge recesses associated with each said tensioning bar so as to restrain deflection of the tensioning bar when the pressure member (80) is axially pushed inwardly.

20. An absorber body as set forth in claim 15 further comprising the bush (74$_b$) being positioned within a surrounding mounting element and being pivotably mounted therein, said bush engaging radial pins which move in guide grooves in the surrounding mounting element (74$_a$).

21. An absorber body as set forth in claim 1 wherein said sealing means comprises a carrier plate provided on a side of the panel which is remote from the channel-like, cross-section shaped foil portions.

22. An absorber body as set forth in claim 21 wherein the foil is welded to at least one of the panel and the carrier plate at regions between said channel shaped foil portions, said weld regions preferably being flat.

23. An absorber body as set forth in claim 22 wherein at least one of the panel and the carrier plate is provided on a foil side with a layer for promoting welding.

24. An absorber body as set forth in claim 22 wherein at least one of the panel and the carrier plate is provided in the weld regions with bores for shanks of connecting members.

25. An absorber body as set forth in claim 1 wherein the foil is fixed to the panel and deep-drawn through the openings to provide said shaped foil portions.

26. An absorber body as set forth in claim 1 wherein the foil is produced from a UV-resistant material.

27. An absorber body as set forth in claim 1 wherein the foil is produced from a modified ethylene-tetrafluoroethylene copolymer.

28. An absorber body as set forth in claim 1 wherein said sealing means comprises a part having a deep drawn portion acting as a connecting duct and shaped portions extending transversely thereto and wherein said part is connected to said first panel and said shaped foil portions associated with said first panel open into the connecting duct.

29. An absorber body as set forth in claim 1 wherein said sealing means comprises a carrier plate with an integrated transverse connection for the shaped portions extending transversely to the carrier plate.

30. An absorber body as set forth in claim 24 wherein the carrier plate is sealingly connected at its edges by at least one of an edge flange-like and crimped connection to the panel which is connected to the foil.

31. A process for the production of an absorber body with flow paths for a flowable heat carrier for heating flow agents by solar energy comprising providing a panel having a series of openings corresponding to a desired pattern of flow paths, covering a surface of said panel with a foil, deep drawing the foil through the openings to provide a series of foil ducts and connecting said foil to the panel at weld zones between the foil ducts.

32. A process as set forth in claim 31 wherein said deep drawing step is performed at a deep drawing temperature and said connecting step comprises immediately welding the foil to the panel at said deep drawing temperature.

33. A process as set forth in claim 32 further comprising gluing said foil to the panel.

34. A process as set forth in claim 31 further comprising welding the foil with the panel to a carrier plate which extends over the foil ducts.

35. A process as set forth in claim 31 further comprising thermally connecting the foil and the panel to another piece of foil which extends over the foil ducts.

* * * * *